United States Patent [19]

Cooley et al.

[11] 4,272,581
[45] Jun. 9, 1981

[54] HEAT RESISTANT DECORATIVE LAMINATE

[76] Inventors: James Cooley, 555 Azalea; Ozzie Fogle, Rte. 3, Box 377F, both of Orangeburg, S.C. 29115

[21] Appl. No.: 70,173

[22] Filed: Aug. 27, 1979

Related U.S. Application Data

[63] Continuation of Ser. No. 949,193, Oct. 6, 1978, abandoned, which is a continuation of Ser. No. 812,232, Jul. 1, 1977, abandoned.

[51] Int. Cl.³ .......................... B32B 5/16; B32B 27/08
[52] U.S. Cl. .................................... 428/328; 156/327; 156/333; 156/335; 428/332; 428/424.6; 428/425.1; 428/425.9; 428/502; 428/505; 428/506; 428/518; 428/522; 428/528; 156/330.9; 260/37 M

[58] Field of Search ............... 428/142, 151, 502, 505, 428/327–329, 518, 511, 515, 524, 525, 356, 506, 528, 332, 520, 522, 424.6, 425.1, 425.9; 156/327, 331, 333, 335; 260/37 M, 39 M; 106/18.26

[56] References Cited

U.S. PATENT DOCUMENTS

| 2,601,284 | 6/1952 | Hemming et al. | 428/461 |
|---|---|---|---|
| 3,248,251 | 4/1966 | Allen | 428/328 |
| 3,441,959 | 4/1969 | Sears et al. | 428/156 |
| 3,729,368 | 4/1973 | Ingham et al. | 428/142 |

Primary Examiner—Paul J. Thibodeau
Attorney, Agent, or Firm—Evelyn M. Sommer; John H. Mulholland

[57] ABSTRACT

A low pressure heat resistant decorative laminate material comprises a wood base member directly secured to a decorative plastic film by an adhesive having aluminum powder dispersed therein.

4 Claims, No Drawings

HEAT RESISTANT DECORATIVE LAMINATE

This is a continuation of application Ser. No. 949,193, filed Oct. 6, 1978, now abandoned, which in turn is a continuation of application Ser. No. 812,232, filed July 1, 1977, and now abandoned.

BACKGROUND OF THE INVENTION

Decorative laminates have a wide range of applications and are generally easier to work with, more versatile and more economical than hardwood plywood and high pressure laminates. They are handsome, durable, machineable and inexpensive substitutes and can be used for furniture, kitchen cabinets, store fixtures, case goods, displays, desk tops and the like.

Two types of decorative laminates are available from Champion International Corporation under the trademarks Decolam/hpt and Vinylcote. These laminates are made of a wood or board substrate to which a decorative overlay which is preprinted with wood grain or solid colors is laminated. The resulting laminate may or may not have a smooth, clear, tough protective layer of an ultraviolet cured polymeric resin.

Hemming et al., U.S. Pat. No. 2,601,284, teach a laminate in which an adhesive is applied to a substrate (board), an aluminum sheet or foil is placed over the adhesive, a second layer of adhesive applied to the sheet or foil and then a wood veneer is placed on the second layer of adhesive. It has now been found that the general type of structure disclosed by Hemming et al can be advantageously modified by eliminating the aluminum sheet or foil and second glue layer and, instead, employing an adhesive which has an aluminum powder dispersed therein.

Accordingly, it is the object of this invention to provide a new and highly advantageous decorative and heat resistant laminate without resorting to the use of the metal foil or sheet therein. This and other objects of the invention will become apparent to those skilled in the art from the following detailed description.

SUMMARY OF THE INVENTION

This invention relates to the woodworking field, and particulatly to the building material industry, the furniture industry, and the fancy container industry. Specifically, the invention relates to a low pressure decorative and heat resistant laminate material where a wood base or other substrate member is directly adhered to a decorative plastic film by an adhesive having aluminum powder dispersed therein.

DESCRIPTION OF THE INVENTION

The substrate employed in the decorative laminate of the instant invention can be chosen from a wide variety of materials such as particle board, hard board, fibre board, lauan plywood, and the like. The substrate serves as a base to which a thin, decorative plastic film is laminated to give the composite structure and the desired appearance. The plastic film is not restricted to any particular plastic but it is presently preferred to use a polyvinyl chloride film which has been preprinted in, for example, simulated wood grain or solid colors. The plastic film generally has a thickness of about 1 to 10 mils, preferably 2 to 6 mils, and the substrate is generally at least about five times thicker than the plastic film.

The thin plastic film is adhered to one or more surfaces of the substrate through the use of an appropriate adhesive or glue. Any of the known and conventional adhesives such as phenol-formaldehyde, urea-formaldehyde, melamine-formaldehyde, furfural resins, polyvinyl resins, urethane resins, mixtures of phenol-formaldehyde and butadiene acrylonitrile synthetic rubber, synthetic rubber derivatives mixed with phenol-formaldehyde resins, polyvinyl butyral mixed with phenol-formaldehyde, and the like can be employed in this invention. Aluminum powder in the form of spherical, flake or other desired shape particles having an average particle size of about 5 to 50 microns is dispersed in the adhesive in the conventional manner such as, for example, by use of a ball mill or colloid mill. The aluminum powder is usually about 10 to 50 weight percent, preferably about 20 to 35 weight percent of the resulting aluminum powder containing adhesive. The use of aluminum powder as herein taught contributes to a great extent to the heat resistant properties of the laminate.

In forming the decorative laminates of the instant invention, the selected substrate is sanded as required, cleaned and then the aluminum powder containing adhesive is coated on the substrate surface and optionally dried. If dried, the adhesive is subsequently reactivated by moderate heating. A preprinted polyvinyl chloride decorative film is placed on the adhesive coated surface and lamination is effected under moderate heat and pressure. Thus, it has been found that pressures of about 8 to 40 kg/lcm, preferably about 12 to 25 kg/lcm, and temperatures of about 160° to 200° C., preferably about 90 to 160 degrees centigrade, are suitable.

Although not essential, it is preferred to provide a tough, heat and water resistant protective coating on the thin plastic film. This is preferably accomplished by spreading a suitable liquid polymeric resin on the plastic film surface and then converting the thermoplastic resin to a strong, infusable, clear, colorless solid. The choice of the polymeric resin is not restricted and can be, for example a polyester resin, an allyl resin, an acrylic resin, polyvinyl chloride-diallylsuccinate, styrene-divinylbenzene, isobutyl urea-formaldehyde, isobutyl melamine formaldehyde, and the like. For ease in handling, it is preferred that the polymeric resin selected be a liquid material which is adapted to quickly cure upon the application of ultraviolet light.

As an example of the present invention, a ⅜ th inch particle board substrate was lightly sanded and cleaned and then coated with a urethane adhesive in which 25% was dispersed aluminum powder having an average particle size of 25 microns. The adhesive coated substrate was then set aside and allowed to dry. Thereafter, the adhesive coated substrate was subjected to a low heat of 130° C. and a 2 mil thick preprinted polyvinyl chloride film was laminated to the adhesive coated surface under roller pressure (about 12 kg/lcm). Thereafter a liquid acrylic resin was applied to the exposed polyvinyl chloride surface in a clean, dust-free atmosphere and immediately cured with ultraviolet light energy.

The use of the aluminum powder filled adhesive in the instant invention is advantageous because the heat dissipation characteristics of the aluminum material are imparted to the laminate. The use of the aluminum powder dispersed in the adhesive is more advantageous than the use of an aluminum sheet or foil as used heretofore because the use of the aluminum powder allows for a cost reduction since the adhesive and aluminum can be applied in the same application.

Various changes and modification can be made in the process and products of this invention without departing from the spirit and scope thereof. The various embodiments set forth herein were for the purpose of further illustrating the invention but were not intended to limit it.

What is claimed is:

1. A low pressure decorative and heat resistant laminate material consisting essentially of a wood containing substrate base member directly secured to a polyvinylchloride film by an organic adhesive selected from the group consisting of phenol-formaldehyde, urea-formaldehyde, melamine-formaldehyde, furfural resins, polyvinyl resins, urethane resins, mixtures of phenol-formaldehyde and butadiene acrylonitrile synthetic rubber, synthetic rubber derivatives mixed with phenol-formaldehyde resins and polyvinyl butyral mixed with phenol-formaldehyde, having aluminum powder with an average particle size of about 1 to 50 microns dispersed therein such that said adhesive contains about 10 to 50 weight percent of said aluminum powder.

2. The decorative and heat resistant laminate material of claim 1 wherein the surface of the plastic film not directly adhered to the substrate base member has a tough, clear, colorless resin coating thereon.

3. In a method of preparing a decorative and heat resistant laminate by the lamination of a wood containing substrate base member to a polyvinylchloride film by means of an organic adhesive, the improvement which consists essentially of employing an adhesive selected from the group consisting of phenol-formaldehyde, urea-formaldehyde, melamine-formaldehyde, furfural resins, polyvinyl resins, urethane resins, mixtures of phenol-formaldehyde and butadiene acrylonitrile synthetic rubber, synthetic rubber derivatives mixed with phenol-formaldehyde resins and polyvinyl butyral mixed with phenol-formaldehyde having aluminum powder dispersed therein such that said adhesive of said aluminum powder contains about 10 to 50 weight percent of said aluminum powder.

4. The method of claim 3 wherein said adhesive contains about 20 to 35 weight percent aluminum powder dispersed therein.

* * * * *